United States Patent [19]

Ayabe

[11] Patent Number: 5,183,286
[45] Date of Patent: Feb. 2, 1993

[54] MOUNTING STRUCTURE FOR LOWER ARM BRACKET

[75] Inventor: Kazuhiko Ayabe, Shizuoka, Japan

[73] Assignee: Suzuki Motor Corp., Japan

[21] Appl. No.: 888,466

[22] Filed: May 21, 1992

Related U.S. Application Data

[63] Continuation of Ser. No. 615,027, Nov. 16, 1990, abandoned.

[30] Foreign Application Priority Data

Mar. 2, 1990 [JP] Japan ............... 2-21304[U]

[51] Int. Cl.$^5$ .................................. B62D 7/02
[52] U.S. Cl. ............................ 280/688; 280/716; 280/724; 280/781
[58] Field of Search .............. 280/733, 670, 701, 724, 280/688, 716

[56] References Cited

U.S. PATENT DOCUMENTS 4,762,336 8/1988 Ogawa et al. ............... 280/673
4,793,629 12/1988 König et al. ................ 280/781

Primary Examiner—Kenneth R. Rice
Attorney, Agent, or Firm—McGlew and Tuttle

[57] ABSTRACT

The present invention relates to a lower arm bracket mounting structure, wherein when the lower arm bracket of the suspension is fixed on the lower surface of the vehicle body member by means of bolts, a stem portion is provided at the base portion of said bolt and a hole is defined through said vehicle member, said hole being engaging with the stem portion of said bolt, whereas a threaded hole into which said bolt is threadably inserted is defined in the tip end of the hole.

2 Claims, 2 Drawing Sheets

MOUNTING STRUCTURE FOR LOWER ARM BRACKET

This is a file wrapper continuation application of application Ser. No. 07/615,027, filed Nov. 16, 1990, now abandoned.

FIELD OF THE INVENTION AND RELATED ART STATEMENT

The present invention relates to a mounting structure for mounting the lower arm bracket of the suspension to a vehicle body in the suspension to be used in the motor vehicles etc.

There are known prior mounting structures of the type wherein a sleeve nut c is secured by means of welding and the like at its opposite ends to a lower side member a and a gusset plate b, as shown in FIG. 3, and a bolt d is threadably inserted into the sleeve-nut c to fix the lower arm bracket e in position between the bolt d and the lower side member a.

Also known is a mounting structure of such a type wherein a sleeve f is interposed between the lower side member a and a gusset plate b as shown in FIG. 4, and a nut g is secured in place on an upper surface of the gusset plate b by means of welding etc., and while a bolt d is threadably inserted into a lower side member a through a lower arm bracket e and a sleeve f which abut with the lower side member a, and the tip end of the bolt d is threadably inserted into the nut g for securement.

Meanwhile, a clearance h is created at the threaded portion between a bolt d and a sleeve nut c (or a nut g) as shown in FIG. 5. Therefore, there was a problem that when an external force larger than a frictional force to be created at the threaded portion is imposed at the lower arm bracket e, the bolt d is caused to move by a distance h equal with this clearance, and thereby altering the alignment of the suspension.

OBJECTS AND SUMMARY OF THE INVENTION

The present invention has been made with the above-described state as a background, and its object is to provide a mounting structure for the lower arm bracket which may not alter alignment of the suspension even when excessively large external forces are imposed. Thus, the purpose of the invention resides in that when the lower arm bracket of the suspension is fixed on the lower surface of the vehicle member by means of bolts, a stem portion is provided at the base portion of the bolt, and a hole is defined in the vehicle body member such that said hole may align with the stem of the bolt, whereas a thread hole into which the bolt is threaded is defined in the tip end of the hole.

BRIEF DESCRIPTION OF THE DRAWINGS

FIG. 1 and FIG. 2 show one embodiment of the mounting structure of the lower arm bracket in accordance with the present invention, wherein;

FIG. 1 is a longitudinal cross-sectional view illustrating the essential portion thereof;

FIG. 2 is a perspective view showing the lower arm in FIG. 1 removed from the vehicle body;

DETAILED DESCRIPTION OF PREFERRED EMBODIMENTS

One embodiment of the present invention will be described hereinbelow, with reference to accompanying drawings.

Figure 1:
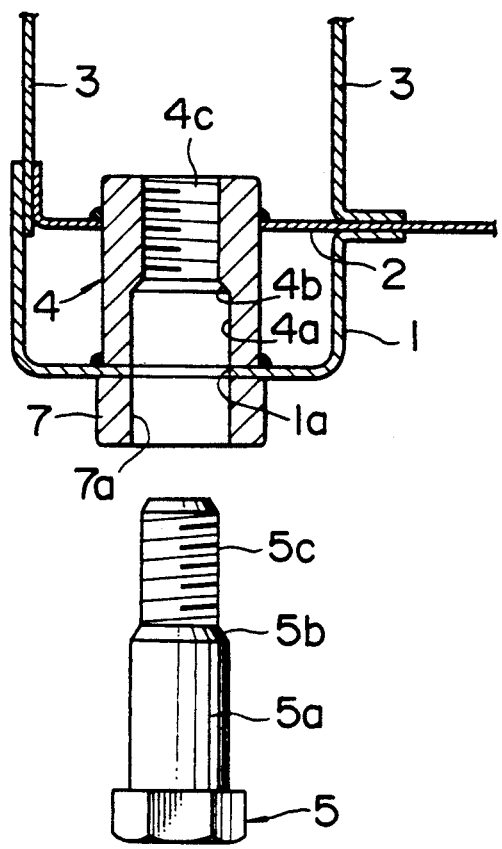

In FIG. 1, there are illustrated a lower side member 1, a gusset plate 2, and a side member barrier 3. The lower side member 1 and the gusset plate 2 are connected to each other through welding at their opposite ends respectively, as shown. A hole 4a in the sleeve 4 is aligned with a hole 1a defined in the lower side member 1, or the hole 1a is made slightly larger in diameter. A tapered portion 4b is formed at the central circumferential wall of the sleeve 4's hole 4a. A female threaded hole 4c is formed at a upper position above the tapered portion 4b. A bolt 5 is provided, having a stem portion 5a and a male threaded portion 5c with a tapered portion 5b therebetween.

Figure 2:
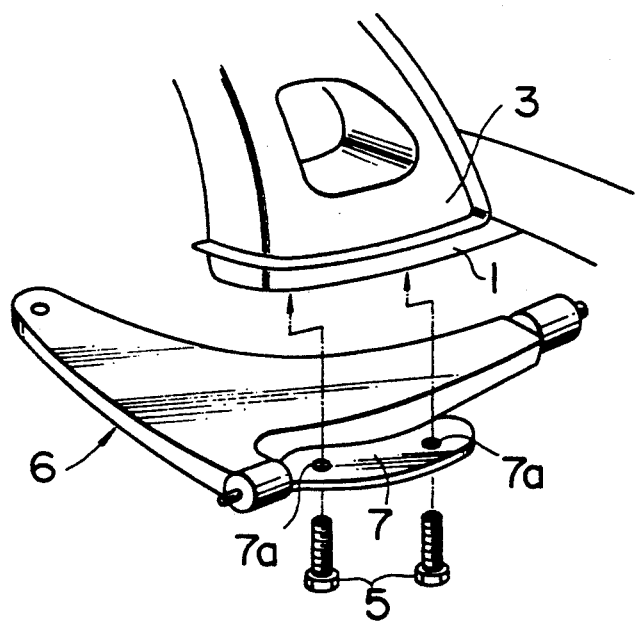
Figure 3:
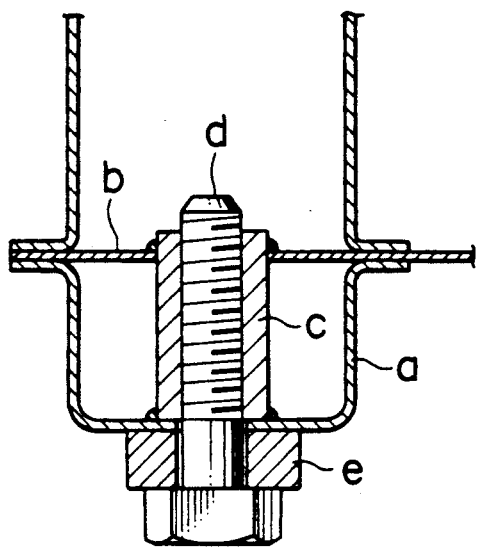
FIG. 3 and FIG. 4 are vertical cross-sectional views showing a prior art embodiment which corresponds with the embodiment in FIG. 3.
Figure 4:
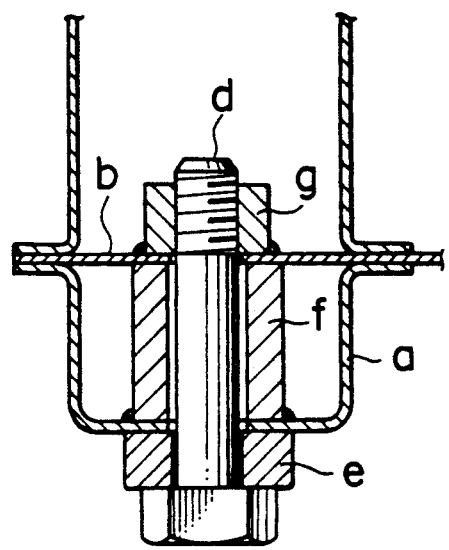
Figure 5:
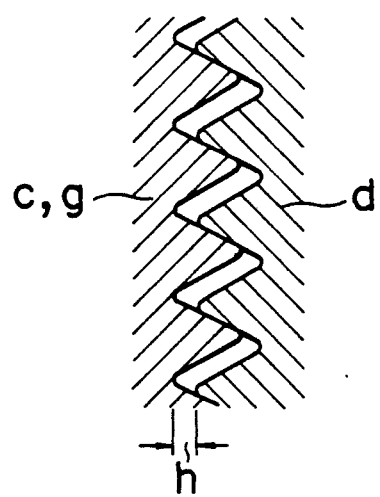
FIG. 5 is a enlarged cross-sectional view showing the threaded portion between the bolt and the nut.

In FIG. 2, a lower arm 6 is illustrated as installed in a front suspension, having a mounting hole 7a defined in the bracket 7 of the lower arm 6. The stem portion 5a of the bolt 5 is inserted into the mounting hole 7a, and the lower arm bracket 7 is fixed in position on the lower side member 1 by threadably inserting the male threaded portion 5c into the female threaded portion 4c in the sleeve 4. Meanwhile, the hole 4a in the sleeve and the mounting hole 7a in the lower arm bracket 7 are placed in an engaging relationship with the stem portion 5a of the bolt 5 by making their diameters substantially equal. A clearance to be created between their engaging faces is made smaller in diameter than that to be created when the threaded portion is inserted (see FIG. 5, h).

This embodiment is constituted as above-described, and therefore the bolt 5 is restricted from moving further as the stem 5a of the bolt 5 is in abutment against the inner surface of the hole 4a of the sleeve 4, even when external forces larger than a frictional force to be created at the threaded portion is imposed on the lower arm bracket 7.

In this embodiment, a sleeve 4 is interposed between the lower side member 1 and the gusset plate 2, but it may also be possible for the hole 4a and the female threaded hole 4c to be formed directly in the lower side member 1, if the vehicle body member comprises a thick portion which is substantially close to the height dimension of the sleeve.

Because the hole in the vehicle body is formed in an engaging relationship with the stem portion of the bolt by making their diameters substantially equal, the suspension may not alter its alignment as the movement of the bolt is restricted by the vehicle member even when external forces larger than a frictional force to be created at the threaded portion is imposed on the lower arm bracket.

I claim:

1. A structure for fixing a lower suspension arm bracket, comprising: a sleeve with upper and lower ends, said sleeve upper and lower ends being joined with a gusset plate and a lower side member by welds, said sleeve defining a fixing hole including a female threaded portion, a tapered intermediate portion and a non-threaded hole portion; a bolt engaging said fixing hole and engaging said lower arm suspension bracket to fix said lower arm suspension bracket to said lower side member, said bolt including a male threaded portion, an intermediate tapered portion and a stem portion, said male threaded portion being dimensioned to engage said female threaded portion of said fixing hole, said tapered portion being dimensioned to engage said fixing hole intermediate tapered portion and said stem portion having a diameter which is substantially the same as a diameter of said fixing hole such that said stem portion engages said fixing hole.

2. A structure for fixing a lower suspension arm bracket, comprising: a sleeve having upper and lower ends joined with a gusset plate and a lower side member by welds; and connection means including a fixing hole formed in said sleeve and a bolt engaging said sleeve and said fixing hole and engaging the lower suspension arm bracket to fix said lower suspension arm bracket to said lower side member, said fixing hole being formed in said sleeve to define a female threaded portion, a tapered portion and a non tapered hole portion, said bolt including a male threaded portion dimensioned for engaging said female threaded portion, a tapered portion dimensioned to engage said fixing hole tapered portion and a stem portion having a diameter substantially the same as a diameter of said non threaded portion such that a surface of said stem portion engages a surface of said non threaded portion for preventing sagging of said bolt relative to said fixing hole to prevent a change in alignment of said lower suspension arm bracket.

* * * * *